United States Patent [19]

Tomasek

[11] Patent Number: 4,888,509
[45] Date of Patent: Dec. 19, 1989

[54] BRUSHLESS SERVO MOTOR CONSTRUCTION AND ALIGNMENT

[76] Inventor: Jaroslav Tomasek, 10024 S. Shore Dr., Plymouth, Minn. 55441

[21] Appl. No.: 152,728

[22] Filed: Feb. 5, 1988

[51] Int. Cl.[4] .............................................. H02K 15/00
[52] U.S. Cl. ...................................... 310/42; 318/677; 310/68 B
[58] Field of Search ............... 310/42, 66, 68 B, 68 R, 310/75 R, 112, 113, 154, 259, 264, 265; 403/354, 355, 356; 318/652, 653, 677, 685

[56] References Cited

U.S. PATENT DOCUMENTS

| | | | |
|---|---|---|---|
| 4,060,745 | 11/1977 | Linscott, Jr. | 310/261 |
| 4,348,607 | 9/1982 | Tankred et al. | 310/254 |
| 4,641,812 | 2/1987 | Vanderlaan et al. | 310/36 |
| 4,651,068 | 3/1987 | Razavi | 318/254 |

Primary Examiner—Patrick R. Salce
Assistant Examiner—Judson H. Jones
Attorney, Agent, or Firm—Lloyd B. Guernsey; R. C. Kamp; R. B. Megley

[57] ABSTRACT

A brushless servo motor for connection to a rotatable load without the need for initial adjustment and calibration of the external position servo loop. A plurality of keyways, keys, pins and projections ensure alignment of motor and position sensor rotors, motor and position sensor stators, motor and load shafts, and motor and load housings to eliminate the need for extensive adjustments. This also facilitates motor replacement without the need for readjustments.

6 Claims, 2 Drawing Sheets

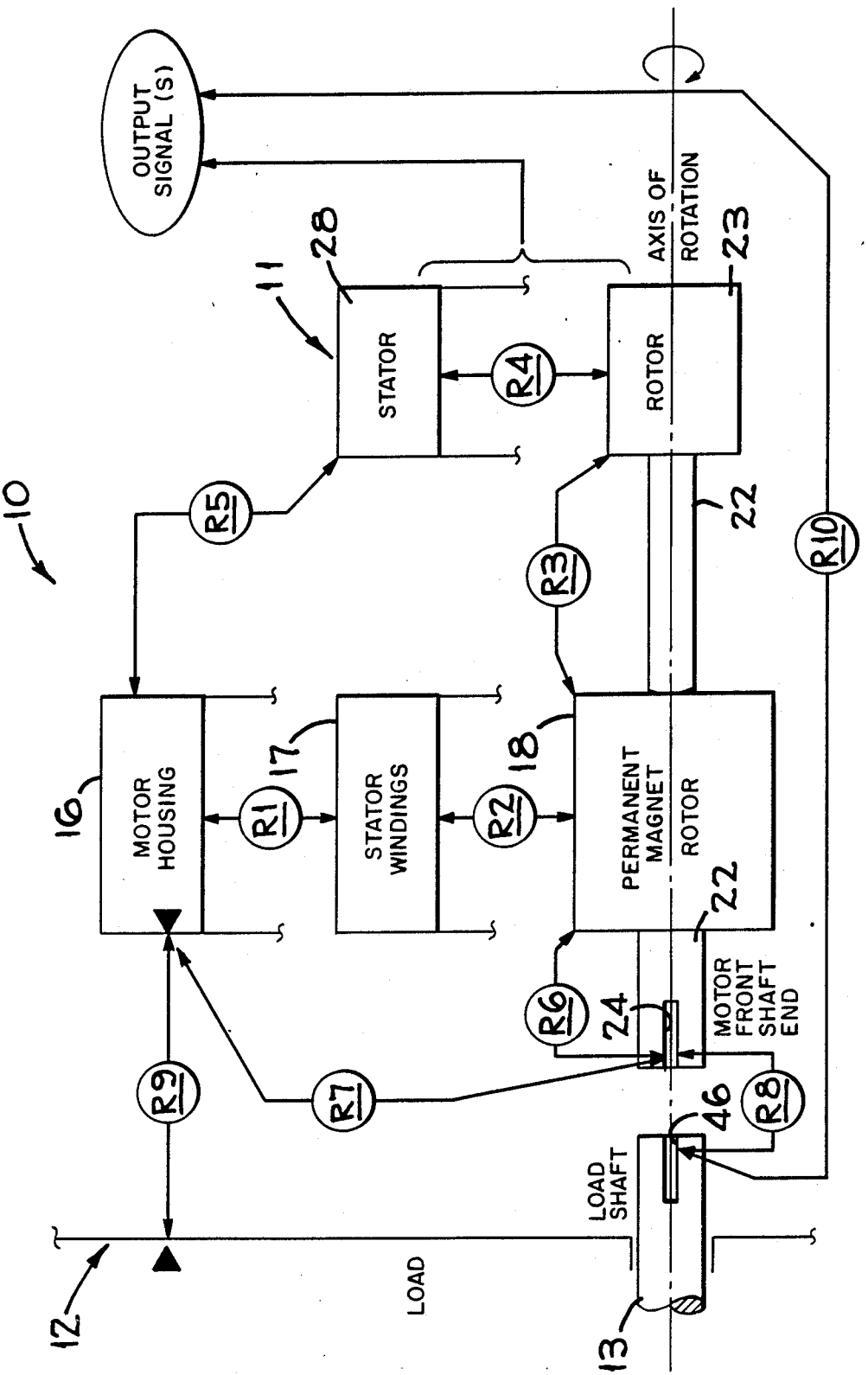

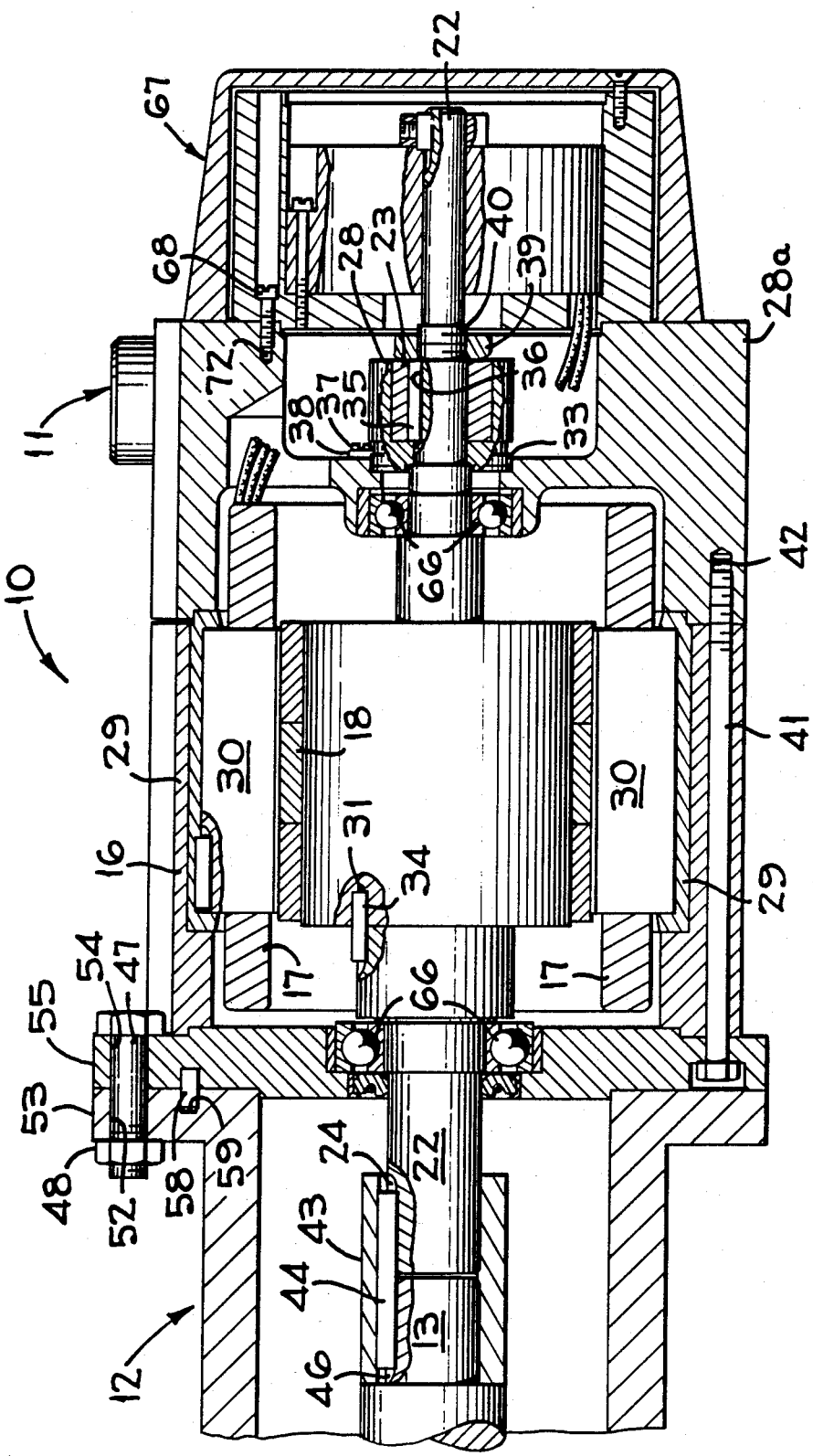

BRUSHLESS SERVO MOTOR CONSTRUCTION AND ALIGNMENT

BACKGROUND OF THE INVENTION

The present invention pertains to brushless servo motors, and more particularly, to the construction and alignment of such a motor to define a repeatable angular relationship between signals from a motor position sensor and the relative angular position of a rotor shaft with respect to a motor housing.

Every brushless servo motor is equipped with a position sensor which provides signals representative of the actual instantaneous angular position of a permanent magnet rotor. These signals are used in a servo amplifier as a part of a servo system internal position loop for controlling the phase of currents to a plurality of stator windings in a proper sequence to cause the motor to operate. The position sensor and servo amplifier provide electronic commutation of the brushless servo motor windings. The integral position sensor, for commutation purposes, must be absolute at least within one electrical revolution of the motor. However, if this sensor can provide an absolute position feedback throughout the entire mechanical revolution of the motor, it can be used for the external position feedback loop which is closed around the entire servo system.

Prior art brushless servo motors require an initial adjustment and calibration of the position servo loop. This adjustment is different for each individual servo system/load combination because there is no specific angular relationship between the servo motor shaft, the mounting surface of the motor and the position sensor output signals. If a motor needs to be replaced, the new motor must be put in place and the position servo loop must be readjusted in order to provide a proper alignment between the load and servo motor position feedback signals.

SUMMARY OF THE INVENTION

The brushless servo motor of the present invention is constructed so that an angular position sensor mounted on the motor provides output signals which define the angular position of the motor rotor shaft. A first mechanical reference on the motor shaft for connection to a mechanical reference on a load shaft and a second mechanical reference on the motor mounting flange for connection to a mechanical reference on the stationary portion of a load ensure that the motor position sensor provides output signals which repeatably define angular position of the load. A plurality of motor windings are positioned about an inner portion of a motor housing and a plurality of rotor magnets are positioned on the motor shaft. The motor shaft extends into the angular position sensor where a sensor rotor is positioned on the shaft. A sensor stator is positioned with respect to the motor housing. A keyway on the motor shaft is aligned with a keyway on a load shaft and a pin mounted on the motor housing fits into a bore in a stationary portion of the load to ensure that the position sensor signals accurately define motor shaft and load shaft positions relative to the stationary portion of the load. Other suitable mechanical references could also be used to secure alignment of all motor and load subassemblies.

BRIEF DESCRIPTION OF THE DRAWINGS

FIG. 1 is a diagrammatic drawing illustrating the accurate positioning required between various parts of the motor position sensor and the load.

FIG. 2 discloses details of apparatus used to obtain the accurate positioning required between the various motor position sensor and load parts.

DESCRIPTION OF THE PREFERRED EMBODIMENT

FIGS. 1 and 2 disclose a brushless servo motor 10 connected between a rotary position sensor 11 and a load 12 having a rotatable shaft 13. The motor 10 includes a motor housing 16 having a plurality of stator winding 17 mounted thereon, and a permanent magnet rotor 18 mounted on a rotatable motor shaft 22. Shaft 22 has a sensor rotor 23 mounted on one end and a keyway 24 positioned at the other end. A sensor stator 28 is positioned about sensor rotor 23 to provide position output signals as the rotor 23 revolves. These sensor output signals define the relative angular position of shaft keyway 24 with respect to motor housing 16. To obtain sensor output signals of a proper phase to enable the motor to generate a torque of the desired polarity throughout its revolution the stator winding 17 must be definitely positioned with respect to motor housing 16 as shown at relationship R1 of FIG. 1; rotary permanet magnets 18 must be definitely positioned with respect to stator windings 17 as shown at relationship R2. Relationships R3-R9 must also have a definite rotational alignment so that the relationship R10, between load shaft 13 and position sensor output signals will be correct and repeatable.

Details of apparatus for aligning the various portions of brushless servo motor 10, position sensor 11 and load 12 are disclosed in FIG. 2. A radially inward projection 29 secures a plurality of laminations 30 and stator windings 17 in an accurately located position inside motor housing 16 for relationship R1. A keyway 31 and a key 34 secure rotary magnets 18 in alignment with keyway 24 on shaft 22. Another key 35 and a keyway 36 secure sensor rotor 23 to shaft 22 in alignment with rotor magnets 18 and ensure that rotor magnets 18 have a defined alignment with the position sensor 11. The stator 28 of sensor 11 is aligned and secured in a sensor housing 28a by a plurality of screws 37 and a plurality of washers 38 (only one of each being shown). The screws 37 can be partially loosened and sensor stator 28 rotated inside the housing 28a to provide the proper phase of sensor output signals relative to rotational position of shaft 22. The screws are then tightened to press washers 38 against a shoulder 33 to secure sensor stator 28 in place. A nut 39 on a threaded portion 40 of shaft 22 secures sensor rotor 23 to shaft 22. A plurality of bolts 41 (only one being shown) are threaded into a plurality of threaded bores 42 to ensure alignment of sensor housing 28a with motor housing 16 and mounting flange 55.

A sleeve 43 secures a key 44 in keyway 24 on shaft 22 and in keyway 46 on load shaft 13 for a defined relationship R8. Load 12 is secured to motor 10 by a plurality of bolts 47 and nuts 48 (only one of each being shown) through a plurality of holes 52 in a flange 53 in load 12 and through a plurality of holes 54 in a mounting flange 55 of motor 10. A pin 58, secured to mounting flange 55, fits into a bore 59 of load 12 to ensure that load 12 is angularly aligned with housing 16 of motor 10.

A plurality of bearings 66 at either end of housing 16 position motor shaft 22 for rotational alignment in motor 10. A motor brake 67 is secured to sensor housing 28a by a plurality of capscrews 68 (only one being shown) each extending into a threaded bore 72. Brake 67 is not considered to be a part of the present invention.

The defined alignment of stators, rotors and housing in motor 10 and position sensor 11 and the defined alignment of shafts 13, 22 and of load 12 with motor housing 16 simplify installation or replacement of a servo motor with a load, the position sensor output signals indicating repeatedly and consistently the absolute rotational position of the motor shaft 22 with respect to its housing 16, as well as the absolute position of the load shaft 13 with respect to the stationary portion of the load as at 12. Servo motor 10 can also be constructed with the permanent magnet rotor on the outside and with stator laminations and windings on the inside.

Although the best mode contemplated for carrying out the present invention has been herein shown and described, it will be apparent that modification and variation may be made without departing from what is regarded to be the subject matter of the invention.

What is claimed is:

1. In a brushless servo motor having means for providing accurate and repeatable correlation between the rotational position of a rotatable shaft couplable to a load and feedback signals from a rotational position sensor, said motor having a plurality of components including:

a rotor having a rotatable shaft with a plurality of magnets mounted thereon, a stator surrounding said rotor and having a plurality of windings mounted thereabout, a motor housing receiving said stator and said windings, and a position sensor having a rotor and a stator for developing motor rotor position feedback signals, the improvement wherein said motor further has:

means (29) for a defined positioning of said stator windings (17) about said motor housing;

means (31) for a defined positioning of said magnets (18) on said rotatable shaft (22);

means (35) for a defined angular orientation of said position sensor rotor relative to said magnets (18);

means (37) for a defined positioning of said sensor stator (28) relative to said motor housing (16), means (44) for repeatably orienting said rotatable motor shaft (22) in a predetermined angular position relative to a load shaft; and means (58) for orienting said motor housing in a predetermined angular position relative to a stationary portion (53) of a load, whereby said respective positioning and orienting means causes a defined reference value of said position sensor feedback signal to correspond to a defined angular relationship between said motor shaft (22) and said motor housing (16), and whereby further, replacement of said motor or any of said components thereof with positioning and orientation thereof by said respective means will produce a repeatable said sensor/shaft signal in operation of said servo motor.

2. A brushless servo motor as defined in claim 1 wherein said means for orienting said load shaft with said motor shaft includes a pair of longitudinally alignable keyways in said shafts and a key mounted in said keyways.

3. A brushless servo motor as defined in claim 1 wherein said means for orienting said stationary portion of a load with said motor housing includes a pin secured to said motor housing and a matching bore in said stationary portion of said load to receive said pin.

4. A brushless servo motor as defined in claim 1 wherein said position sensor develops said position feedback signals indicative of an absolute angular position of said rotatable shaft within one complete mechanical revolution.

5. A brushless servo motor as defined in claim 4 wherein said position feedback signals are made available externally for closing a position feedback loop around the entire servo motor.

6. The brushless servo motor of claim 1 wherein each said respective positioning or orienting means for said components comprises rigid mechanical interconnection means having only a single orientation with respect to the connected components, excepting the said positioning means between said sensor stator (28) and motor housing (16), wherein said positioning means for said sensor stator/housing components includes rigid mechanical interconnection means having a plurality of selectable orientations therebetween.

* * * * *